US006603925B2

(12) United States Patent  (10) Patent No.: US 6,603,925 B2
Enderle  (45) Date of Patent: Aug. 5, 2003

(54) OPENING DEVICE FOR SINGLE USE CAMERAS

(75) Inventor: Larry Raymond Enderle, Kansas City, MO (US)

(73) Assignee: Fujicolor Processing, Inc., Elmsford, NY (US)

( * ) Notice: Subject to any disclaimer, the term of this patent is extended or adjusted under 35 U.S.C. 154(b) by 0 days.

(21) Appl. No.: 09/800,035

(22) Filed: Mar. 6, 2001

(65) Prior Publication Data

US 2002/0127009 A1 Sep. 12, 2002

(51) Int. Cl.[7] .............................................. G03B 17/02
(52) U.S. Cl. ........................................... 396/6; 396/388
(58) Field of Search ................................. 396/388, 120, 396/429, 6, 536, 538

(56) References Cited

U.S. PATENT DOCUMENTS 5,063,400 A * 11/1991 Takei et al. ..................... 396/6
5,576,789 A * 11/1996 Patton ........................ 396/387
5,655,155 A * 8/1997 Bergstresser et al. ....... 396/388
5,659,828 A * 8/1997 Shimizu et al. ............. 396/388
5,802,400 A   9/1998 Hochreiter et al.
6,151,449 A * 11/2000 Horning et al. ............. 396/535
6,208,807 B1 * 3/2001 Uchida et al. .............. 396/429

* cited by examiner

Primary Examiner—Russell Adams
Assistant Examiner—Michelle P Nguyen
(74) Attorney, Agent, or Firm—Stroock & Stroock & Lavan LLP

(57) ABSTRACT

A camera opening device for use with a single-use camera having an exposure button and a canister containing a film therein includes a base, a winding portion disposed in the base and which winds the film into the canister, and at least one of an end opening portion disposed in the base and which can remove an end of the canister; and a bottom opening portion disposed in the base and which can remove a bottom portion of the camera. The winding portion may have a winding receptacle dimensioned and disposed to receive the camera, an exposure button pressing device an interlock switch which detects if the exposure button is pressed, a winding switch, a motorized wheel, and a camera winding holding device.

20 Claims, 16 Drawing Sheets

OPENING DEVICE FOR SINGLE USE CAMERAS

FIELD OF THE INVENTION

The present invention relates to camera opening devices and, more particularly, to a camera opening device for a single use camera.

BACKGROUND OF THE INVENTION

Single use cameras are a popular way for people to take photographs. After the single use camera has been used, the exposed film has to be processed to form the negative from which photographs can be developed.

In general, a single use camera has a light-weight plastic shell, a viewfinder for visually aligning the picture, an exposure button for taking the picture, and a lens. The lens is usually not adjustable, which allows for simple and inexpensive manufacturing as well as ease of use for the camera user. A single use camera usually comes as either an outdoor camera which does not have a flash unit, or an indoor camera, which has a flash unit. The single use camera comes loaded with film. Usually, the film is arranged within the camera such that most of the film is disposed outside of the canister. After the user depresses the exposure button, taking a photograph, the user then turns the winding wheel in order to advance the film for the next frame. This winds the exposed portion of the film into the canister. This procedure is repeated as each exposure is taken, and so the film is gradually wound into the canister. By the time that all of the film has been used, substantially all of the film will be wound in the canister. This system differs from that of most multi-use cameras, wherein initially the film is fully contained within the canister and is gradually withdrawn from the canister with each successive exposure and winding.

For this reason, in a standard multi-use camera, once all the exposures have been taken, the film must then be rewound back into the canister. In contrast, in a fully exposed single use camera the exposed film is already completely, or nearly completely, contained in the canister.

In general, single use cameras fall into one of two different configurations. The first configuration is a bottom opening camera. As depicted in FIG. 1, a bottom opening camera has a bottom film compartment door 102. Bottom film compartment door 102 must be opened so that film canister 104 can be removed. The other camera configuration is the end opening camera. The end opening camera 106 shown in FIG. 2 has end film compartment door 108 which must be opened for the film canister 104 to be removed.

Once fully-used, the entire single use camera is sent to a photographic developing center for processing. At the photographic developing center the canister of film is removed from within the camera. The film is then developed in a known manner. The single-use camera is typically opened and the canister of exposed film extracted by a technician. The technician will generally do this using one of two methods to remove the film from the single use camera. The method chosen will depend on whether the single use camera is of the bottom opening or end opening type.

Conventionally, the photographic film technician removes the film, from either type of single use camera, by hand. Since the film may not be fully wound into the canister, the first step in the film removal process is to advance the film until it is fully contained within the canister. This is done to insure that the film is fully contained within the canister before the canister is removed, preventing the ambient light from degrading the exposed film. The photographic film technician does this by depressing the exposure button while turning the winding wheel. Single use cameras are often designed so that if the user has not already fully wound the film into the canister, the technician turning the winding wheel will feel a physical resistance or hard stop once the film is fully contained within the canister. If all of the available exposures on the film have been used, then only a minimal amount of winding is necessary. If, however, only a portion of the available exposures have been utilized, then more winding will be necessary.

Once the film is fully wound, the technician opens the film compartment door. This is usually done by prying the door open with a screwdriver or similar flat bladed tool. In the case of a bottom opening camera, a bottom film compartment door is opened, whereas in the case of an end opening camera, an end film compartment door is opened.

With both types of single use cameras, the process of opening the compartment door and removing the film canister can be time consuming, tedious, difficult, and, should the technician's hand slip while holding the opening tool, dangerous. These shortcomings in the manual film removing process are amplified by the current popularity of the single use cameras. Due to this popularity, photographic film technicians are required to open a large number of cameras. When a large number of cameras must be manually opened, accuracy of the opening process may suffer, and tedium and physical exhaustion may a result.

SUMMARY OF THE INVENTION

The present invention is directed to a camera opening device for opening single use cameras.

In an exemplary embodiment, the present invention is directed to a camera opening device, for use with a single use camera having an exposure button and a canister containing film therein. The camera opening device includes a base and a winding portion, disposed in the base, which winds the film into the canister. The camera opening device also has at least one of an end opening portion disposed in the base and which can remove an end of the camera and a bottom opening portion disposed in the base and which can remove a bottom portion of the camera. The winding portion of the camera opening device may have a winding receptacle that is dimensioned and disposed to receive a camera. The winding portion also may include an exposure button pressing device for pressing the camera's exposure button when the camera is in the winding receptacle. The winding portion also may have a camera winding holding device that helps to secure the camera in place when film is being wound. A motorized wheel which cooperates with the camera's winding wheel to wind the film is also provided. To ensure that the exposure button is depressed before the motorized wheel begins to wind, an exposure button interlock detects whether the exposure button has been pressed before winding can begin. The winding portion also has a winding switch which controls the winding process once the camera is inserted into the winding receptacle.

Single use cameras typically have a winding interlock which insures that the proper amount of film is drawn past the shutter and into the canister for each exposure. As previously noted, single use cameras come loaded with most of the film outside the canister, and as exposures are made the film is gradually drawn into the canister. The winding interlock only allows the winding wheel to be turned by an amount sufficient to draw a single exposure of film, including side borders, into the canister. Once the winding wheel has been turned by that amount, the interlock prevents the winding wheel from turning until after the exposure button has been pressed and a picture has been taken. Pressing the exposure button resets the winding interlock so that the winding wheel can now be turned to draw the exposed film into the canister and fresh film into position for exposure. This insures that successive exposures are regularly spaced and located directly adjacent to one another on the film.

The winding interlock prevents the winding wheel from being turned continuously to draw all of the film into the canister. Consequently, a technician preparing to open a single use camera must repeatedly turn the winding wheel until the interlock engages and then press the exposure button to trigger the shutter until all of the film is contained in the canister. This intermittent winding to draw the film into canister is time-consuming and tiring for the technician. Even if the technician holds the exposure button continuously while turning the winding wheel, repeatedly turning the winding wheels of successive cameras will tire the technician.

The present invention allows for continuous winding of the film. As discussed in greater detail below, this is accomplished by providing a motorized wheel that turns the winding wheel at the same time that an exposure button pressing device depresses the exposure button. This way the motorized wheel can turn the winding wheel continuously until the film is drawn fully into the canister.

In use, a technician will insert a single use camera, either end opening or bottom opening type, into the winding receptacle. When placed into the winding receptacle, the camera is oriented with the exposure button facing upward and the film compartment facing toward the camera opening device. Once the camera is in the winding receptacle, the technician depresses the winding switch. This causes the exposure button pressing device to press the exposure button while the motorized wheel turns the camera's winding wheel, so that the film is drawn completely into the canister.

When the winding switch is placed in the winding position, the camera winding holding arm extends into within the winding receptacle and presses against the camera, facilitating secure positioning of the camera. Also, an exposure button interlock switch detects that the exposure button is pressed before winding begins. This function serves as a safety feature which prevents the camera, the film and the film canister from being damaged, as might occur if the motorized wheel turned the winding wheel while the exposure button is not depressed. The inner workings of the single use camera are such that pressing the exposure button releases a catch on the winding mechanism for the film canister.

The technician can hold the exposed end of the camera during this winding process and can feel vibration when the film is completely wound. There also may be audible cues indicating when the film is completely wound, since the camera opening device will generate different sounds when the film is winding, as opposed to when the film is fully wound. Once the film is completely wound, the technician releases the winding button and removes the camera from the winding receptacle.

After the film is fully wound, the technician then proceeds to the camera opening step. If the camera is a bottom opening camera, the camera is inserted by the technician into the bottom opening receptacle. Once the camera is in the receptacle, the technician depresses the bottom opening switch. The bottom opening switch actuates a bottom opening camera retention device and the film door prying device. The bottom opening camera retention device secures the camera in place while the film door is pried open by the prying device. Once the door is opened, the technician releases the bottom opening switch and removes the camera from the bottom opening receptacle.

A comparable procedure is performed for end opening cameras where the camera is placed in the end opening receptacle and the technician depresses the end opening switch. The end opening switch actuates a film door hooking device which opens the film door on the end opening camera. Once the door is opened, the technician releases the end opening switch and removes the camera from the end opening receptacle.

By using the present invention, a technician can quickly and accurately wind the film in a single use camera and then open the camera's film door of the camera to remove the film canister. This speeds the camera opening process and requires less physical exertion on the part of the technician. Further, since the camera opening device is designed so that the camera is precisely aligned within the winding and opening receptacles, the film door can be readily opened.

In general, the camera opening device may be box shaped. The camera opening device can be mounted on a counter or a table top, or could have an integral base structure. The winding receptacle, as well as the end opening and bottom opening receptacles, can be accessed from, and are disposed on, the front. The winding switch, as well as the end opening and bottom opening switches, are also disposed on the front side of the camera opening device.

The camera opening device can use both electrical and pneumatic power (alternatively, at least one of the operations involved with opening and extracting the film canister could be powered manually). The electrical system is powered by a connection to a standard 110 volt AC connection. This AC power is stepped down through a step down transformer and then rectified in a rectifier bridge to provide DC current. The DC voltage is then used to drive a DC motor, which turns a motorized wheel during film winding. The power may be controlled via a power switch disposed on the first side of the camera opening device. The DC power supply to the winding motor may also be interrupted by the exposure button interlock system. Specifically, if the exposure button is not depressed, power will not flow to the winding motor.

In the pneumatic system, pressurized air enters the camera opening device via a fitting disposed on the back of the camera opening device. The air pressure can be checked using an air pressure gauge disposed on the top of the camera opening device. This pressure may be regulated by the air pressure adjustment knob disposed on the side of the camera opening device.

With respect to the pneumatic system, the winding button controls air flow to the winding camera holding device as well as the exposure button depressing device. The end opening switch controls air flow to the film door hooking device. Further, the bottom opening switch controls air flow to the bottom opening camera holding device as well as the film door prying device.

An access cover is disposed on the top of the camera opening device. The access cover can be removed to obtain access to the electrical and pneumatic systems disposed within the housing of the camera opening device. The access cover facilitates easy maintenance and troubleshooting of the unit.

Other objects and features of the present invention will become apparent from the following detailed description, considered in conjunction with the accompanying drawings. It is to be understood, however, both this specification and the drawings, which are not to scale, are designed solely for the purpose of illustration and not as a definition of the limits of the invention, for which reference should be made to the appended claims.

BRIEF DESCRIPTION OF THE DRAWINGS

In the drawing Figures, which are not to scale, and which are merely illustrative, and wherein like reference characters denote similar elements throughout the several views.

DETAILED DESCRIPTION OF THE PREFERRED EMBODIMENTS

Figure 3:
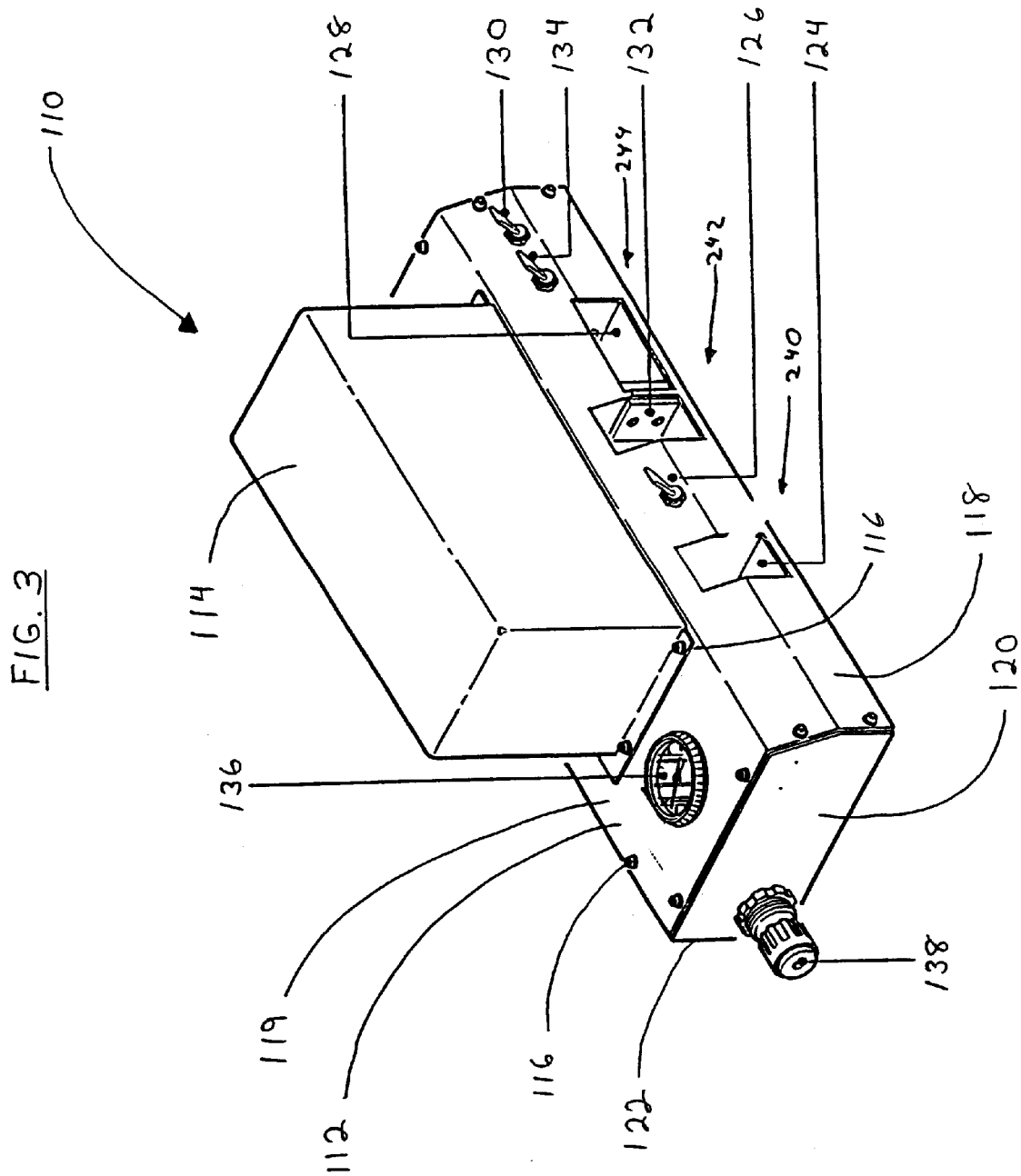
FIG. 3 is perspective view showing the front, top and one side of a camera opening device constructed in accordance with the present invention.
Figure 4:
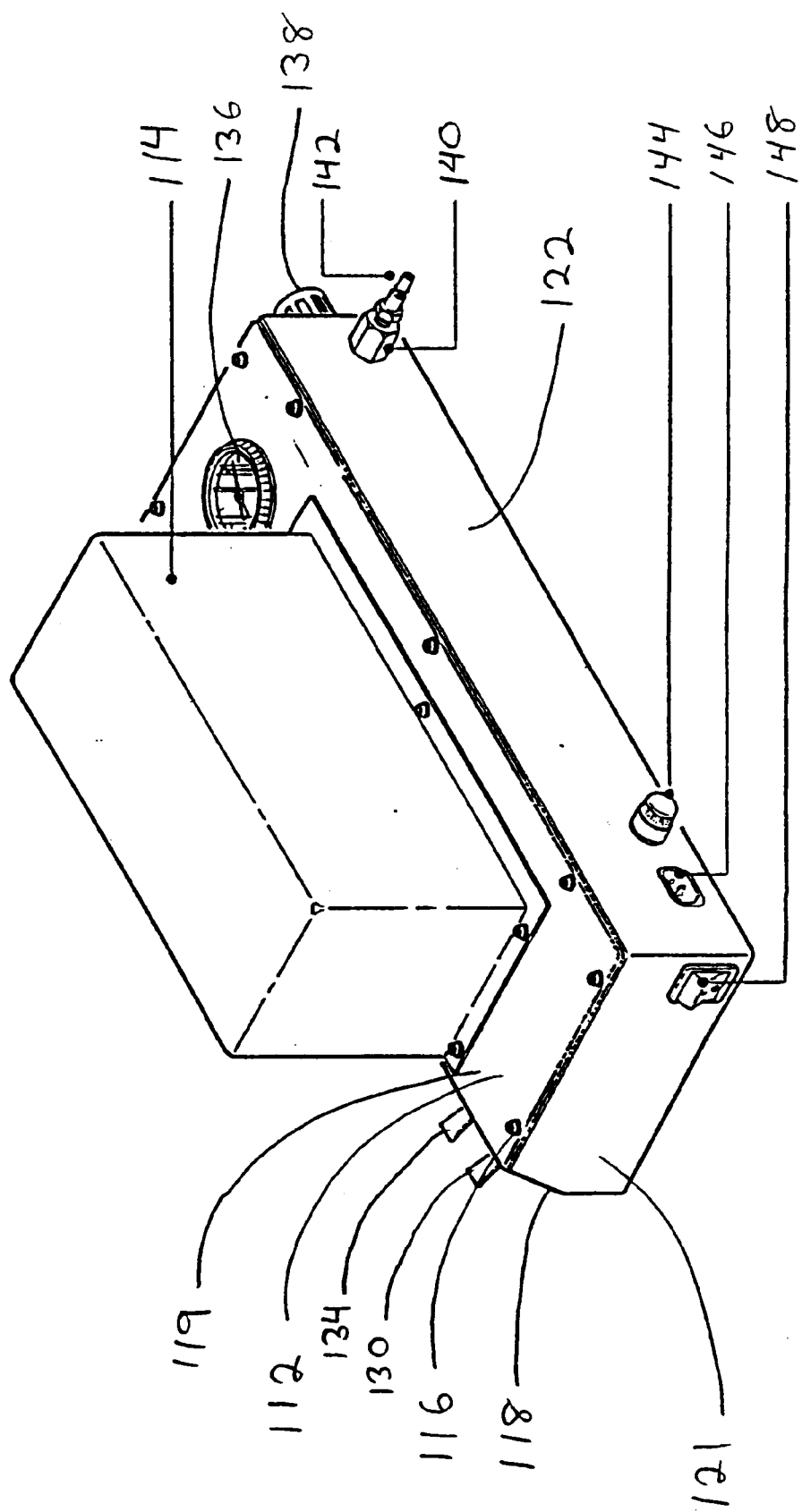
FIG. 4 is a perspective view showing the rear, top and other side of the camera opening device depicted in FIG. 3.

Referring to FIGS. 3 and 4, there is shown a camera opening device 110 constructed in accordance with the present invention. Camera opening device 110 includes a base 112, which can be box shaped and have a front 118, top 119, first side 120, second side 121 and back 122. Base 112 can be formed of metal or plastic or any other suitable material. In an exemplary embodiment, base 112 is formed of sheet metal sections dimensioned to fit together into the appropriate shape of the base. The sections may be held together by fasteners 116. Fasteners 116 may be screws. In the alternative, front 118, top 119, first side 120, second side 121 and back 122 may be welded together or held together by other fastening means such as adhesive or a snap fit arrangement. In an exemplary embodiment, base 112 may be dimensioned so that it will rest stably on a table or counter top. Alternatively, base 112 may be formed wit a bracket or other mounting device so that it may be mounted securely to a wall or other vertical surface.

A compressed air fitting 140 is disposed on the back 122 of base 112. A compressed air supply (not shown) may be attached to the compressed air fitting 140 via nipple 142. Alternatively, other means of connecting a compressed air supply may be used, such as a hard piped connection or a screw fit adapter connection. Air pressure adjustment knob 138 is disposed on the first side 120 of base 112. Air pressure adjustment knob 138 is used to adjust and regulate the compressed air supply within camera opening device 110 after it flows through compressed air fitting 140. Air pressure gauge 136 is disposed on the top 119 of base 112, and is used to display the pressure of the compressed air within camera opening device 110 as adjusted by air pressure adjustment knob 138.

Power cord socket 146 is disposed on the back 122 of base 112. Power cord socket 146 is designed to receive a standard 110 volt AC power cord so that electrical power may be supplied to camera opening device 110 (other electrical power sources and voltages could be used). Power switch 148 is disposed on second side 121 and is used to control the internal electrical power of camera opening device 110. Fuse holder 144 is disposed on the back 122 of base 112. Fuse holder 144 is designed so that a fuse (not shown) may be placed in-line electrically with the electrical power supply to afford protection to the electrical components within camera opening device 110.

Access cover 114 is removably disposed on the top 119 of base 112. Access cover 114 may be selectively removed from the top 119 of base 112 in order to afford access to the inner workings of camera opening device 110. In an exemplary embodiment, access cover 114 is secured to top 119 by fasteners 116, which by way of non-limiting example, may be a standard machine screw or other type screw fastener. In the alternative, access cover 114 may be secured to the top 119 by a press fit or other means known in the art. Winding receptacle 124 is disposed in the front 118, and is dimensioned so that a single use camera may be partially disposed therein. Winding switch 126 is also disposed on the front 118, and is used in conjunction with winding receptacle 124. Similarly, end opening receptacle 132 is disposed on front 118 and is also dimensioned so that a single use camera may be partially disposed within end opening receptacle 132. End opening switch 134 also disposed on front 118 is used to control the opening of an end opening single use camera and is used in conjunction with end opening receptacle 132. In the same manner, bottom opening receptacle 128, dimensioned to partially receive a single use bottom opening camera, is also disposed on front 118. Bottom opening switch 130, also disposed on front 118, is used in conjunction with the bottom opening receptacle 128.

Figure 1:
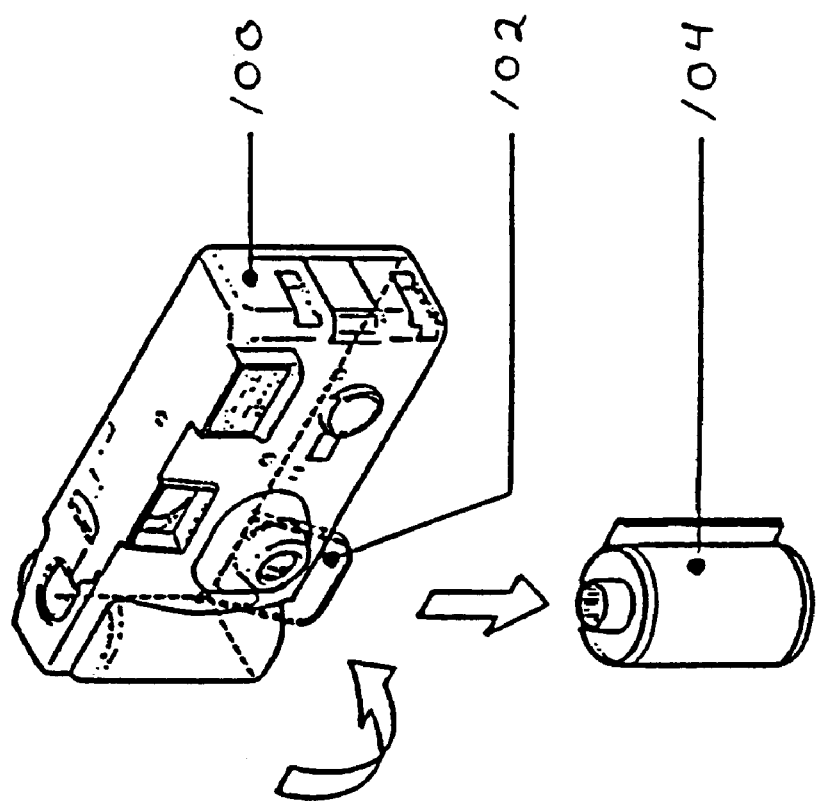
FIG. 1 is a perspective view showing the front, top and one side of a bottom opening camera, and a film canister therefor.
Figure 2:
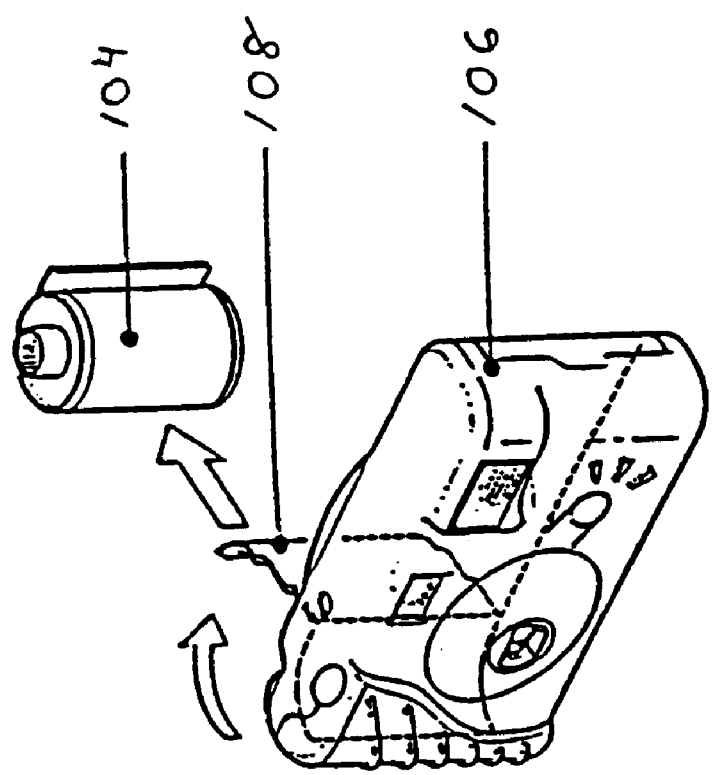
FIG. 2 is a perspective view showing the front, top and one side of an end opening camera and a film canister therefor.
Figure 5:
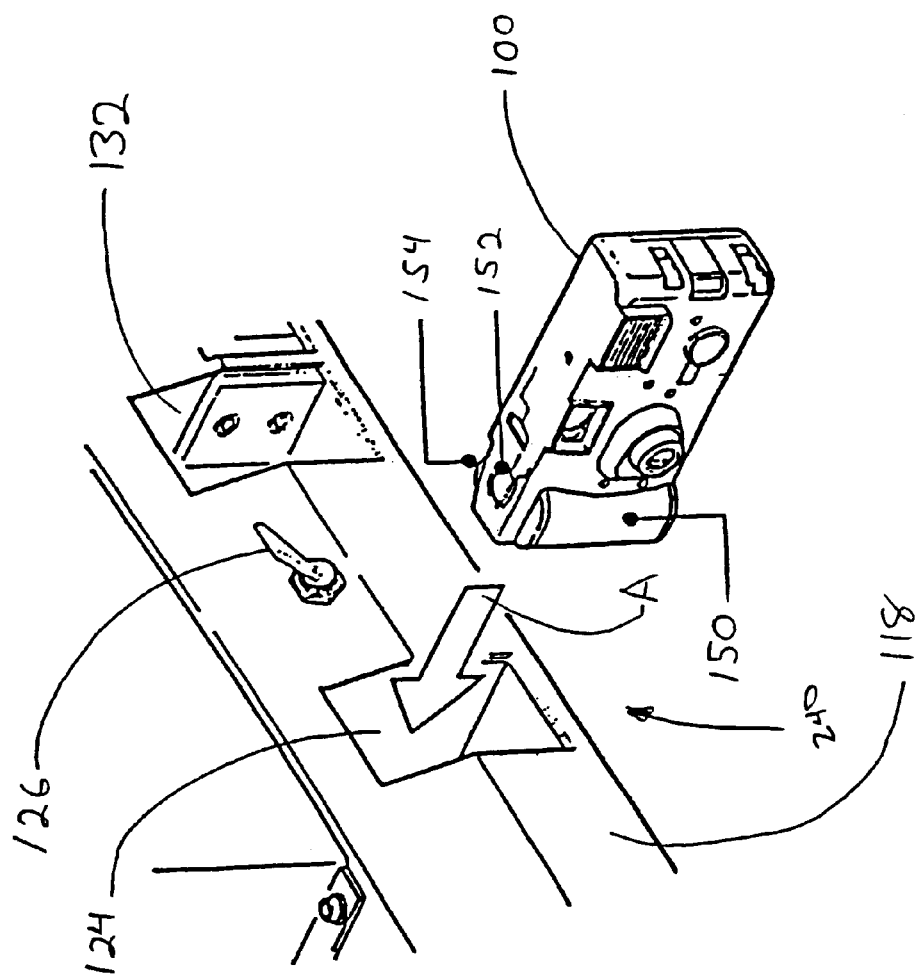
FIG. 5 is an enlarged view of a portion of the camera opening device of FIG. 3, prior to insertion of a camera therein.
Figure 6:
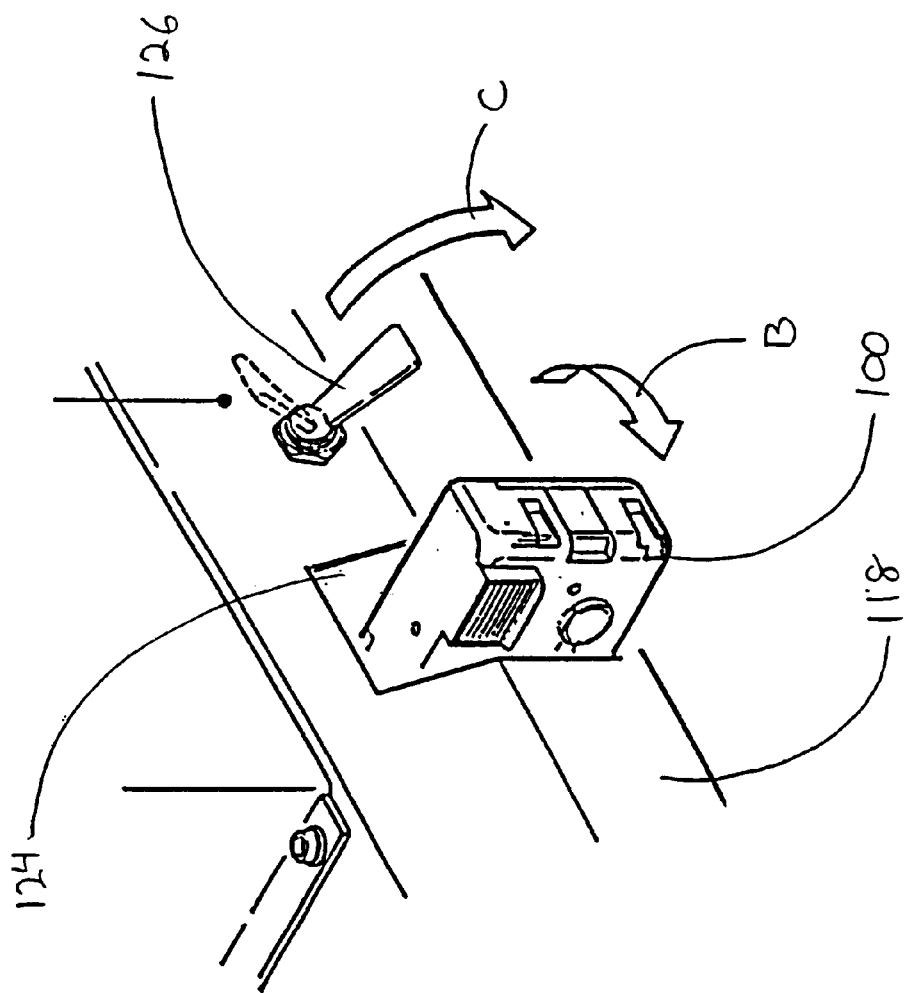
FIG. 6 is an enlarged view of a portion of the camera opening device of FIG. 3, after insertion of the camera therein.
Figure 13:
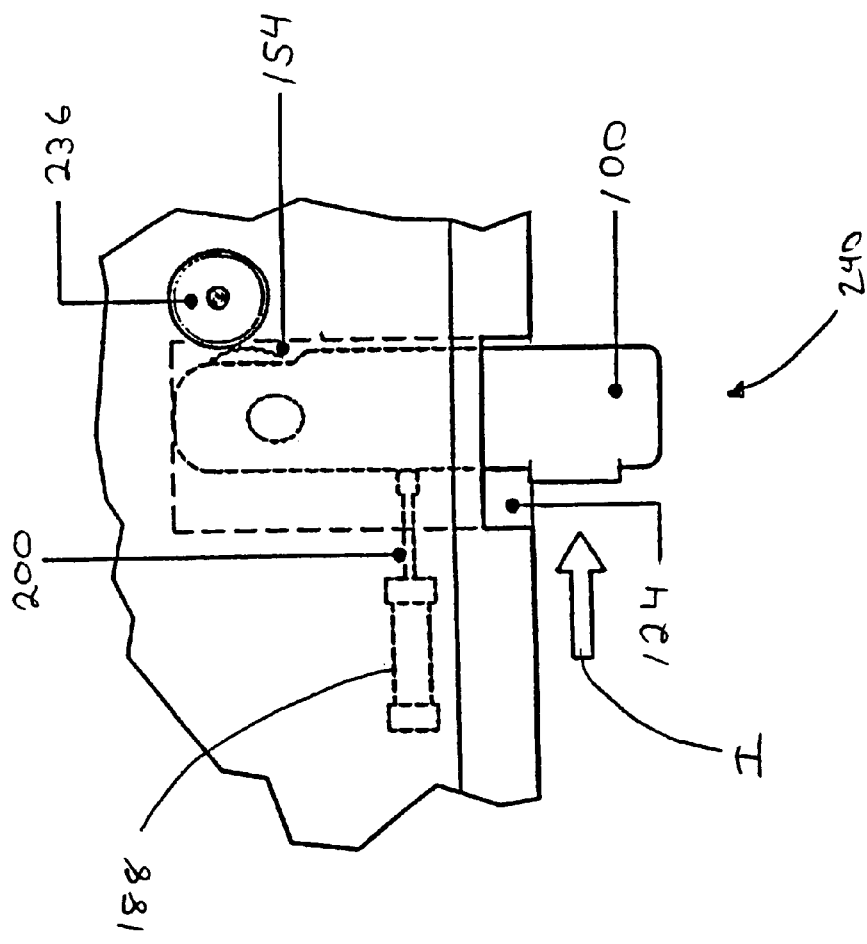
FIG. 13 is a top plan view corresponding to FIG. 16, showing the winding receptacle.

Turning now to FIGS. 5, 6 and 13 the winding portion 240 of camera opening device 110 is described in further detail with reference to a bottom opening camera 100 comparable to that depicted in FIG. 1. Bottom opening camera 100 has an exposure button 152 and a winding wheel 154. Bottom opening camera 100 is a single use camera with film disposed in film compartment 150, and optionally may include a flash subasssembly for supplemental illumination of the subject, typically, at night. Exposure button 152 is the button depressed by the user to take photographs. Winding wheel 154 is rotated by the user after each photograph is taken in order to advance the film to the next exposure.

Before opening bottom opening camera 100, a technician preferably advances the film so that it is fully wound within the canister. This way, when the film canister is removed, none of the film is exposed to light and none of the exposures that have been taken by the user will be destroyed or otherwise damaged. In order to wind the film, the technician aligns bottom opening camera 100 such that exposure button 152 faces upward and film compartment 150 faces camera opening device 110. The camera is then moved in the direction of arrow A such that bottom opening camera 100 is partially disposed within winding receptacle 124. The technician can determine that bottom opening camera 100 is properly disposed within winding receptacle 124 when the camera strikes a back surface (not shown) within the camera opening device and so can no longer be moved in direction A. Once bottom opening camera 100 is properly disposed within winding receptacle 124, the technician depresses winding switch 126. Winding switch 126, by way of non-limiting example, is a two-position selector switch having off and winding positions. The selector switch may be spring biased such that the technician must continually apply force to winding switch 126 in order to maintain it in the winding position. Should that force be removed, the switch springs back to the off position. Alternatively, winding switch 126 may be a two-position maintained selector switch. Further, winding switch 126 could be a push button switch or other suitable switch.

The technician can determine that the film has been fully wound into the canister upon hearing a click from within bottom opening camera 100. At the same time, vibrations will be felt if the technician holds the camera 100 while it is disposed within winding receptacle 124.

Winding of the film can be facilitated by having the technician press against bottom opening camera 100 in the direction of arrow B as the bottom opening camera 100 is held in winding receptacle 124. Pressing the camera in the direction of arrow B affords better contact between motorized wheel 236 and winding wheel 154 of bottom opening camera 100, as will be clear from FIG. 13.

The amount of winding required will depend upon whether all of the film in the camera has been exposed. If the user of the camera has used all of the available film to take the allotted amount of photographs, then the film will already be substantially within the canister before the winding process begins. In this case, a relatively short winding period will be needed. If, however, only some of the allotted exposures have been taken, then more winding will be needed since more of the film will be disposed outside of the canister before the winding process begins.

With continued reference to FIGS. 6 and 13, bottom opening camera 100 is shown partially disposed within winding receptacle 124. When winding switch 126 is moved in the direction of arrow C in order to initiate winding, motorized wheel 236 turns winding wheel 154 of camera 100. Motorized wheel 236 is positioned so that it abuts winding wheel 154 when camera 100 is disposed within winding receptacle 124. In order to maintain physical contact between motorized wheel 236 and winding wheel 154, winding camera holding device 188 is also actuated to help secure camera 100 when winding switch 126 is placed in the winding position. Camera winding holding arm 200 extends from winding camera holding device 188 and presses against the front surface of camera 100, applying force to camera 100 in the direction of arrow I. This force contact between motorized wheel 236 and winding wheel 154 facilitates proper winding of the film. In an exemplary embodiment, winding camera holding device 188 can be a pneumatic piston which moves camera winding holding arm 200 to the extended position using air pressure. As an alternative, winding camera holding device 188 could use an electrical solenoid device or any other suitable device to move the winding holding arm 200.

As a further alternative, the motorized wheel 236 could be replaced with a manually-driven wheel (not shown). Such a manually-driven wheel could, by way of non-limiting example, be operated when the technician turns a crank assembly (not shown), or the motorized wheel 236 could have provision for manual operation built in.

Operation of the present invention will now be described with reference to FIG. 11. Exposure button depressing device 192, along with camera holding device 188, is actuated when winding switch 126 is placed in the winding position. Exposure button depressing device 192 has exposure button depressing arm 204, which extends outward when winding switch 126 is placed in the winding position and which retracts when winding switch 126 is returned to the off position. Exposure button depressing foot 206 is located at the end of the exposure button depressing arm 204 closest to the winding receptacle 124 and is dimensioned to depress exposure button 152 when bottom opening camera 100 is disposed within winding receptacle 124 and winding switch 126 is placed in the winding position, causing exposure button depressing arm 204 to extend into the winding receptacle 124. In an exemplary embodiment, exposure button depressing device 192 also could be used in the same manner as with winding camera holding device 188 alternative structures.

Exposure button interlock 198 is disposed such that an interlock is triggered when exposure button depressing foot 206 is extended in the exposure button depressing position. Exposure button interlock 198 is connected electrically with motorized wheel 236 such that motorized wheel 236 will not turn unless exposure button depressing foot 206 is in the exposure button depressing position. Exposure button interlock 198 serves to protect camera 100 so that the camera 100 cannot be damaged by inadvertent winding of the turning wheel 154 by the motorized wheel while the exposure button 152 is not depressed (single-use cameras are generally constructed so that after the turning wheel 154 has been turned by a predetermined amount of shutter is cocked and a trigger immobilizes the turning wheel, and so the shutter must be tripped and the trigger released before the turning wheel can be turned further). This arrangement prevents against inadvertent winding without the exposure button 152 being depressed, as might, for example, occur were an electrical power cord hooked up to power cord socket 146 and power switch 148 turned on without compressed air being supplied to compressed air socket 140. Such winding without the exposure button being depressed might occur if the air pressure adjustment knob 138 were adjusted such that when winding switch 126 is placed in the winding position, there would be insufficient air pressure to actuate the exposure button depressing device 192 to depress the exposure button 152. Consequently, the interlock switch actuator 208 is positioned such that electrical contact is made when exposure button depressing foot 206 is extended in the exposure button depressing position. In an exemplary embodiment, exposure button interlock 198 is a two-positioned electrical pivoting interlock switch. Again, by way of non-limiting example, a reed type interlock switch or other sensing device, such as an ultrasonic or optical-type sensor might be used. Alternatively, other interlock devices may be used as would suit the purpose of this device.

While the functions and structures of the winding portion of the camera opening device have been described above with respect to use with bottom opening camera 100, the winding portion 240 may be used in like manner with end opening camera 106. That is, winding portion 240 may be used for both bottom opening cameras 100 and end opening cameras 106 and is suited to performing the winding functions on both types of cameras.

Figure 7:
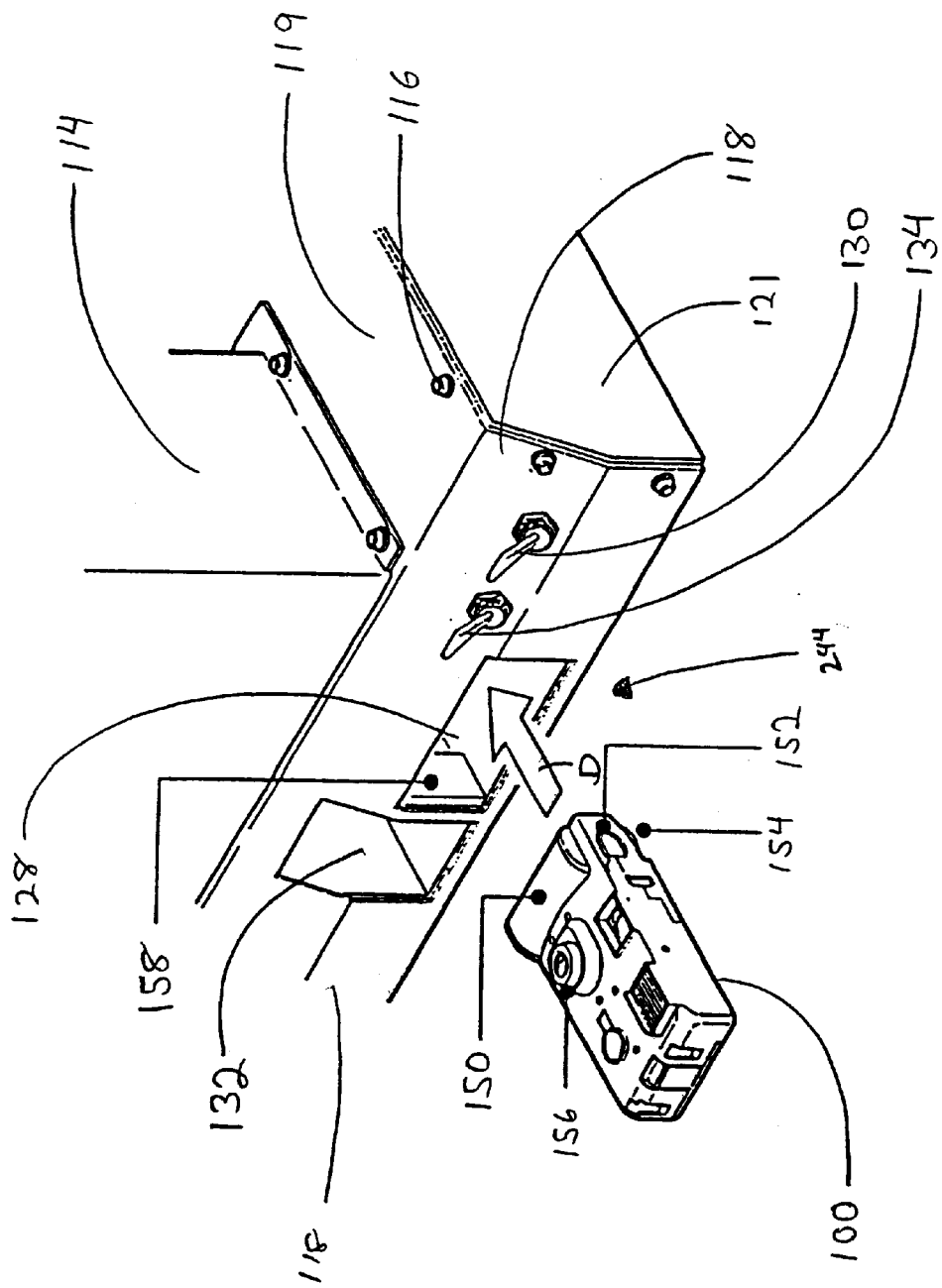
FIG. 7 is an enlarged view of a portion of the camera opening device of FIG. 3, prior to insertion of the camera therein.
Figure 8:
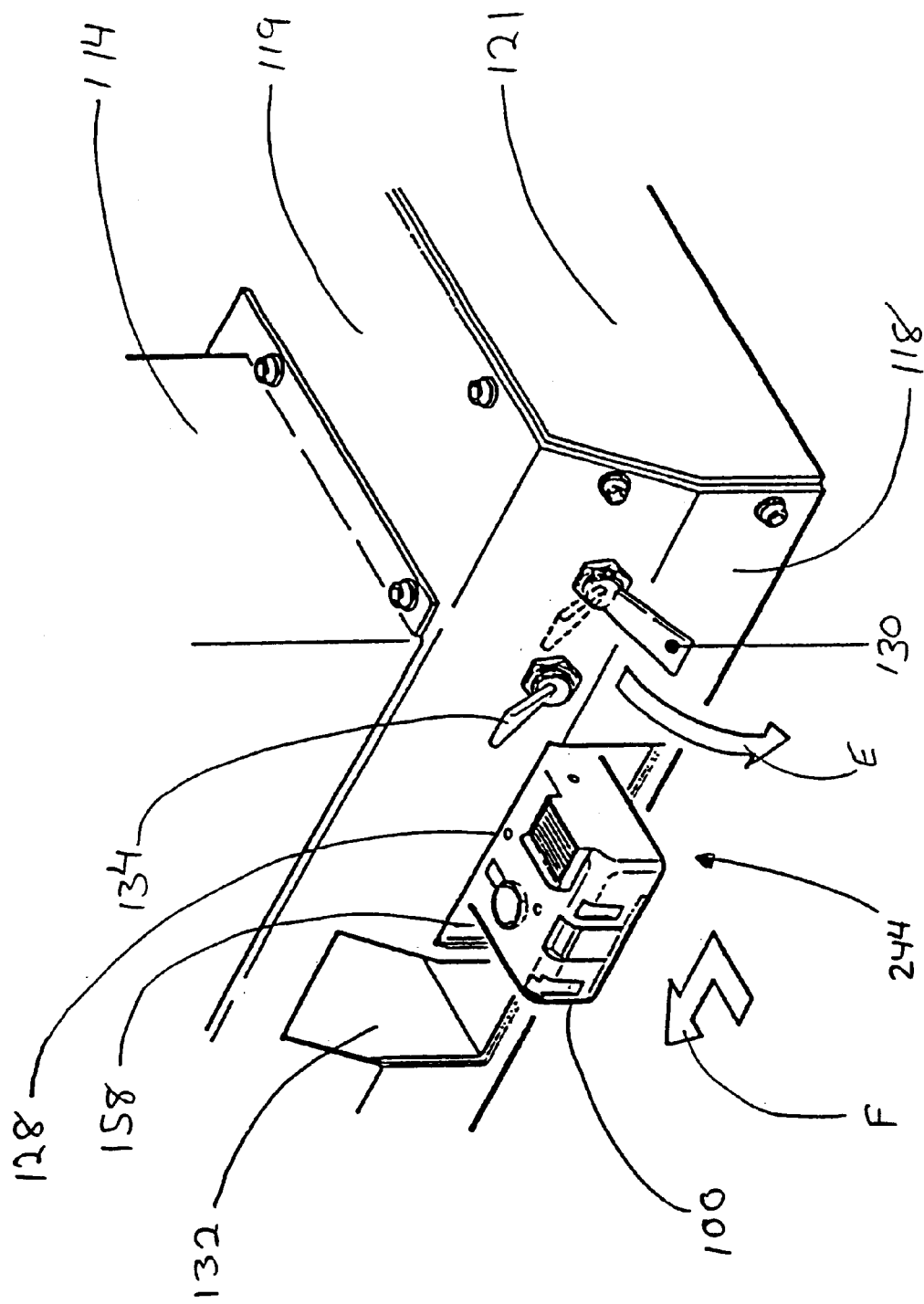
FIG. 8 is an enlarged view of a portion of the camera opening device of FIG. 3 after insertion of the camera therein.

Turning now to FIGS. 7 and 8, the function and operation of bottom opening portion 244 of camera opening device 110 is described. In contrast to winding portion 240, which works equally well for winding both bottom opening cameras 110 and end opening cameras 106, bottom opening portion 244 of camera opening device 110 is designed specifically for opening the film door of a bottom opening camera 100.

In use, a technician orients bottom opening camera 100 as shown in FIGS. 7 and 8 such that lens 156 is facing upward and film compartment 150 is facing toward camera opening device 110. Bottom opening camera 100 is then moved in the direction of arrow D so that bottom opening camera 100 is partially disposed within bottom opening receptacle 128. The technician can determine that bottom opening camera 100 is properly disposed within bottom opening receptacle 128 when bottom opening camera 100 strikes the back surface of bottom opening receptacle 128 and so is physically kept from further movement in the direction of arrow D. Once bottom opening camera 100 is disposed within bottom opening receptacle 128, the technician depresses bottom opening switch 130 in the direction of arrow E in order to effect the opening of the film door 102 in bottom opening camera 100. Bottom opening switch 130 may be any type of switch such as those previously described with respect to winding switch 126.

When the technician depresses bottom opening switch 130, film door prying device 196 is actuated to pry open the film door of bottom opening camera 100. With reference now to FIG. 11, prying arm 214 is disposed partially within film door prying device 196 and extends outwardly toward bottom opening camera 100 when bottom opening switch 130 is moved in the bottom opening direction. Prying blade 216 is disposed on the end of prying arm 214 nearer camera 100 and is designed to open the film door 102 of bottom opening camera 100 when it is moved toward the camera 100. Film door prying device 196, in an exemplary embodiment, may include a pneumatic piston and cylinder. Alternatively, film door prying device 196 may be designed along the lines described above with regard to exposure button depressing device 192 and winding camera holding device 188.

Bottom opening camera holding device 190 is also actuated when bottom opening switch 130 is depressed in the bottom opening position. Bottom opening holding arm 218 is disposed within bottom opening camera holding device 190 and moves out toward and presses against camera 100 when bottom opening switch 130 is placed in the bottom opening position. Bottom opening holding end 220 is disposed at the end of bottom opening holding arm 218 nearer the camera 100 and presses against bottom opening camera 100 when bottom opening camera holding device 190 is actuated. Bottom opening camera holding device 190 thereby secures bottom opening camera 100 in place during the film door opening process. Bottom opening camera holding device 190, in an exemplary embodiment, may be a pneumatic piston and cylinder, or may be designed in a manner comparable to that already discussed in connection with film door prying device 196.

As can be seen in FIG. 7, stop block 158 is disposed within bottom opening receptacle 128 and serves to align the bottom opening camera 100 during the film door opening process. Stop block 158 abuts against a portion of bottom opening camera 100 when bottom opening camera holding device 190 is actuated and provides a flat, firm and secure surface which helps to hold the bottom opening camera 100 in place. By facilitating the securement of bottom opening camera 100, the precise opening of the film door by film door prying device 196 is facilitated as the alignment of film door prying device 196 with the proper position of film door in bottom opening camera 100 will be facilitated.

Stopblock 148 also allows a single camera opening device 110 to accommodate several different size cameras, since different size stop blocks can be used when opening different sized cameras.

The technician can determine that the film door has been opened after hearing a noise made by the camera opening device during this film door opening process.

Further, the technician may hold bottom opening camera 100 while it is partially disposed in bottom opening receptacle 128 and apply a force in the direction of arrow F such that bottom opening camera 100 rests firmly against stop block 158. This way, the technician may feel vibration emanating from camera 100 when film door prying device 196 is actuated and opens film door 100.

Once the technician has determined that the film door has been opened, the technician may release bottom opening switch 130, so that both film door prying device 196 and bottom opening camera holding device 190 are deactivated. When deactivated the prying blade 216 and bottom opening holding end 220 are both retracted away from bottom opening camera 100. The technician can then remove bottom opening camera 100 from bottom opening receptacle 128. Since the bottom film compartment door 102 has been opened by the camera opening device 110, film canister 104 can be removed from bottom opening camera 100.

Bottom film compartment door 102 can, by way of non-limiting example, be a discrete hinged door which is moved by the film door prying device 196. If desired, a lip could be formed on the door at a position where it will be engaged by the prying blade 216. Alternatively, the bottom film compartment door 102 could be an integral part of the camera body, in which case the camera body could have one or more breaklines provided in known fashion to define the door 102.

Opening the door means creating a space sufficient to permit removal of the film canister. It is not necessary that a portion of the camera body actually be detached.

Figure 9:
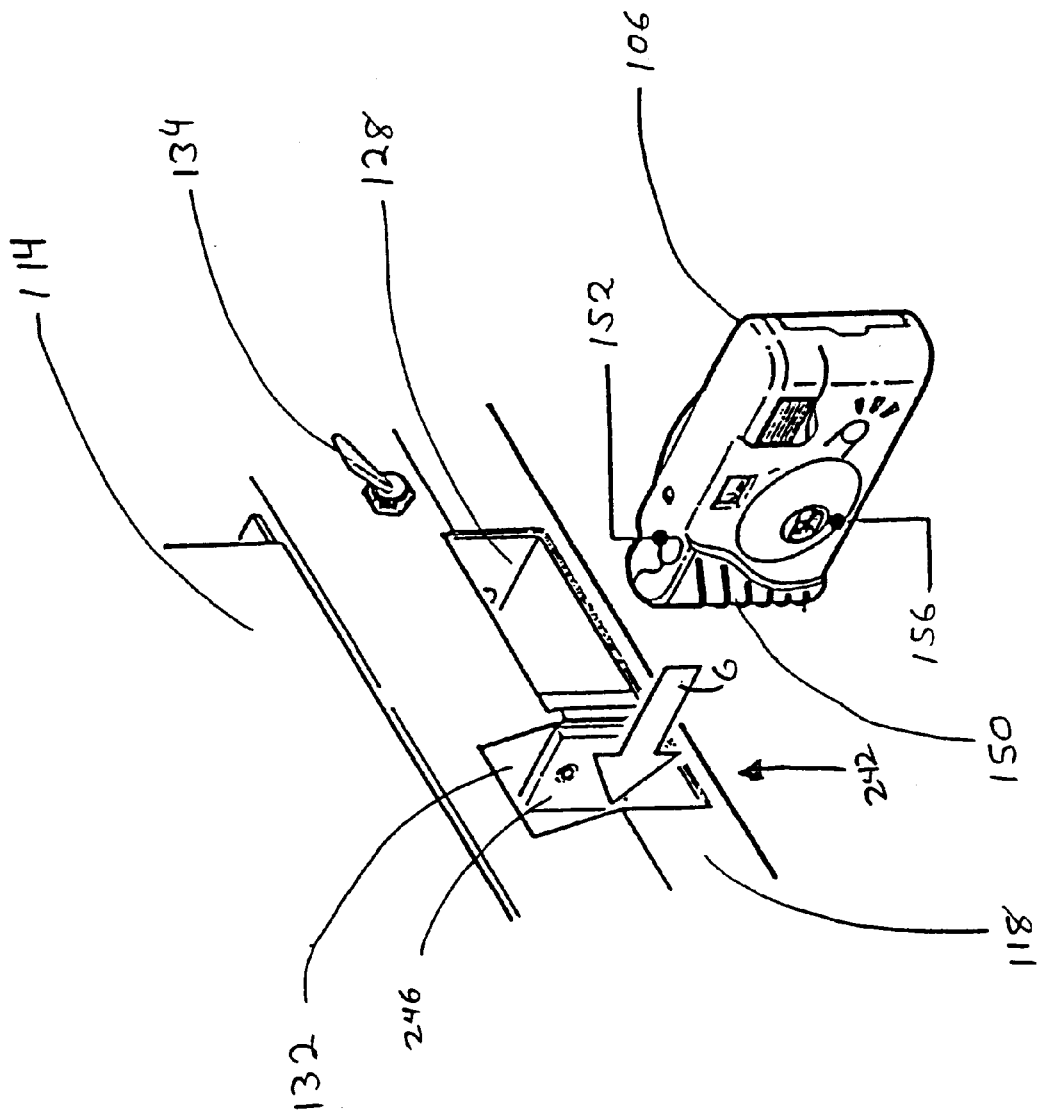
FIG. 9 is an enlarged view of a portion of the camera opening device of FIG. 3 prior to insertion of a camera therein.
Figure 10:
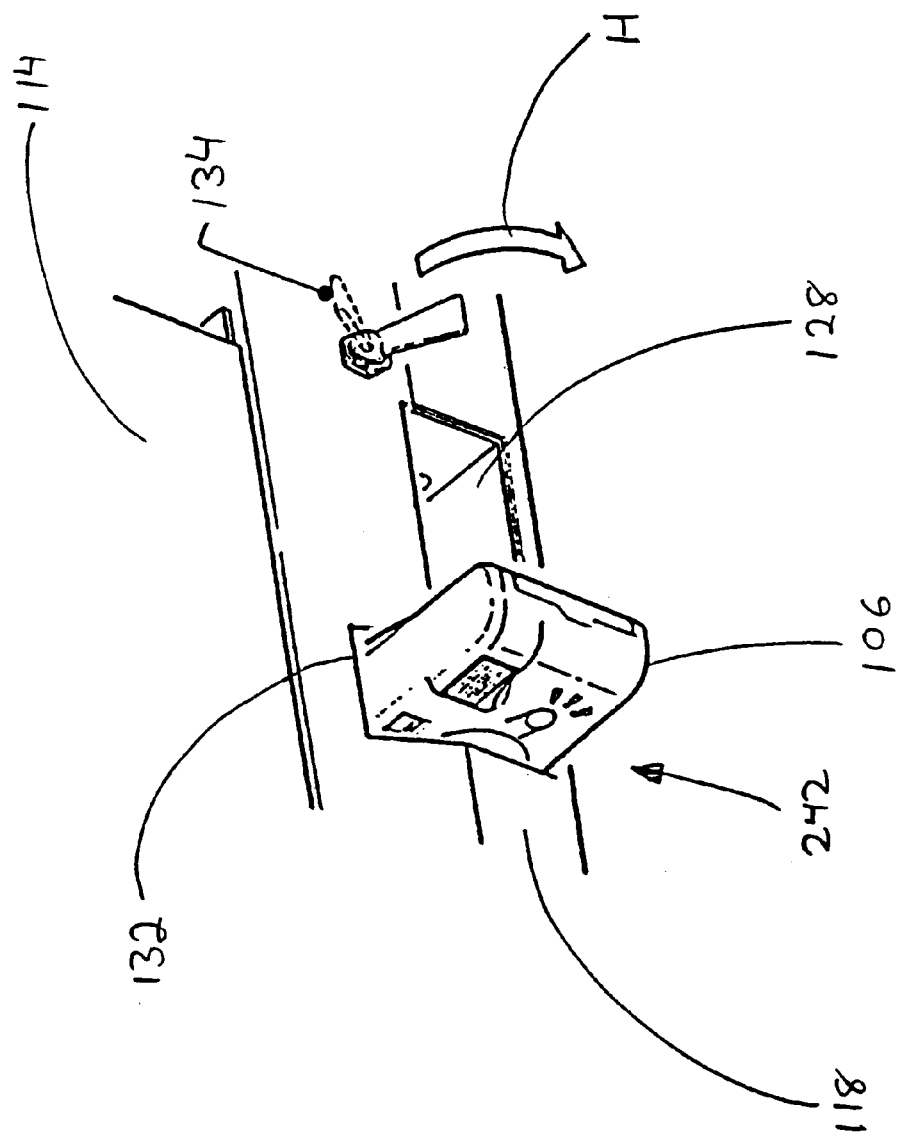
FIG. 10 is an enlarged view of a portion of the camera opening device of FIG. 3 after insertion of the camera therein.

Turning now to FIGS. 9 and 10, the end opening portion 242 of camera opening device 110 is discussed in further detail. End opening portion 242 performs a function comparable to that of side opening portion 244 discussed above, wherein the film door of an end opening camera 106 is opened. Whereas bottom opening portion 244 is used to open the bottom film compartment door 102 in a bottom opening camera 100, however, the end opening portion 242 is used to open an end opening film compartment door 108 in an end opening camera 106. While both the bottom opening portion 244 and end opening portion 242 both perform the function of opening the film compartment doors 102, 108 respectively, they are designed differently in order to accommodate the different physical structures of end opening cameras 106 and bottom opening cameras 100.

Like bottom-opening camera 100, end opening camera 106 includes exposure button 152. A film canister 104 is disposed inside of film compartment 150. End opening camera 106 also has a lens 156.

In use, the technician orients end opening camera 106 as depicted in FIG. 9 so that exposure button 152 is pointing upward and film compartment 150 is positioned by the front 118 of camera opening device 110. In a manner similar to that previously discussed with respect to the bottom opening portion and the winding portion, the technician then moves end opening camera 106 in the direction of arrow G so that it is partially disposed within end opening receptacle 132. As explained with regard to insertion of a camera into the bottom opening receptacle 128 and the winding receptacle 124, the technician will be able to determine when end opening camera 106 is properly positioned within end opening receptacle 132 when a portion of end opening camera 106 contacts the back surface of end opening receptacle 132 and the end opening camera 106 cannot be moved further in the direction of arrow G. Once end opening camera 106 is properly positioned within end opening receptacle 132, the technician depresses end opening switch 134 in the direction of arrow H, thus initiating the end opening process.

Figure 11:
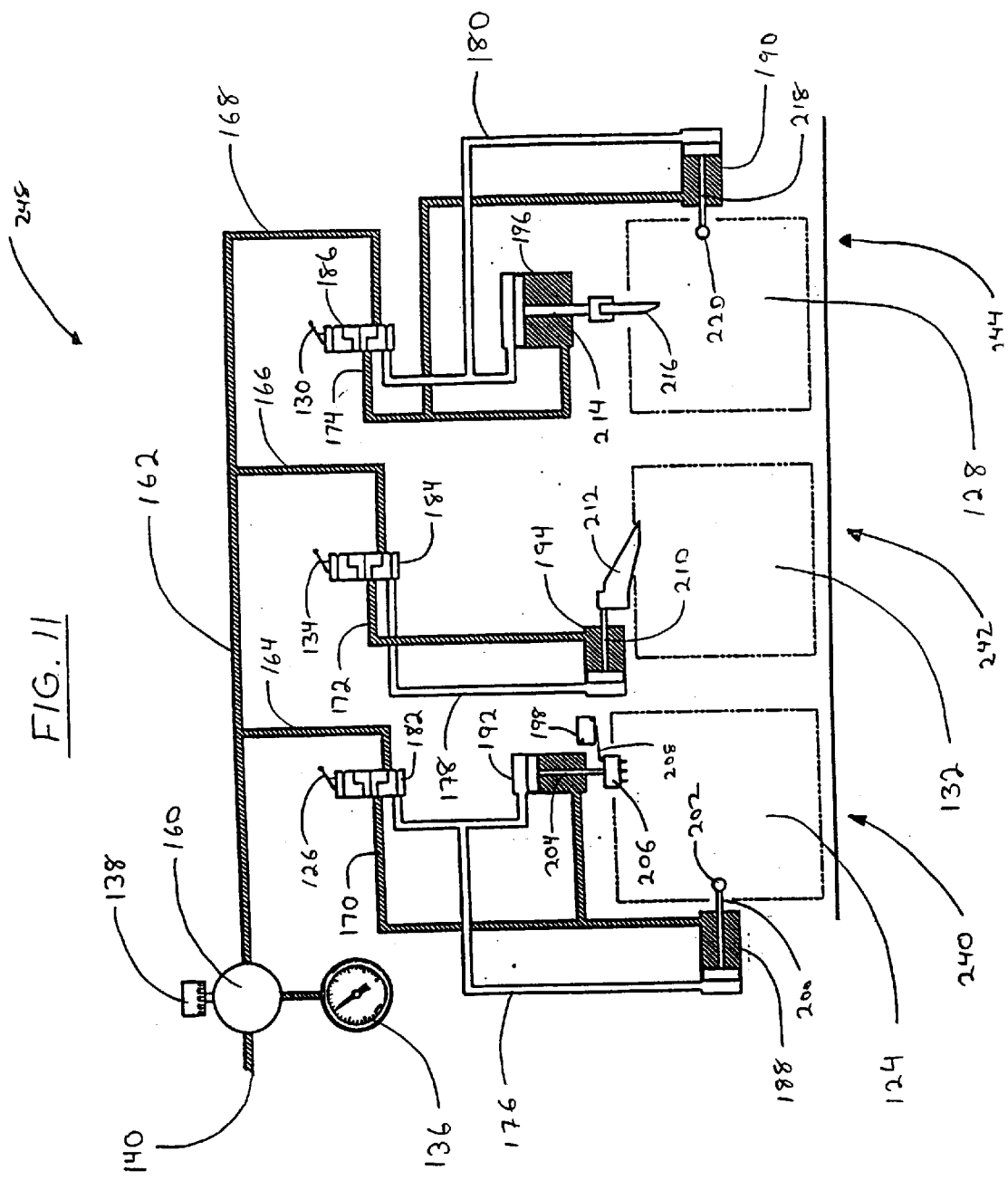
FIG. 11 is a schematic view of a pneumatic system suitable for use with the present invention.

Turning to FIG. 11, film door shearing device 194 is disposed in part within end opening receptacle 128 and is actuated in response to pressing of the end opening switch 134. Shearing arm 210 moves in a horizontal direction generally transverse to the camera body when film door hooking device 194 is actuated. Shearing blade 212 is disposed on a distal end of shearing arm 210 and when moved in the direction of arrow J shown in FIG. 15, shears open end film compartment door 108. More specifically, shearing blade 212 is shaped and dimensioned such that end film compartment door 108 will be opened when end opening camera 106 is disposed within end opening receptacle 128 and end opening switch 134 is depressed in the end opening position to activate shearing device 194. Film door shearing device 194, in an exemplary embodiment, may be a pneumatic device having a cylinder and piston activator. In the alternative, it may be designed along the lines already discussed above with respect to the bottom opening camera holding device 190, the film door prying device 196, the winding camera holding device 188 and exposure button depressing device 192.

Figure 14:
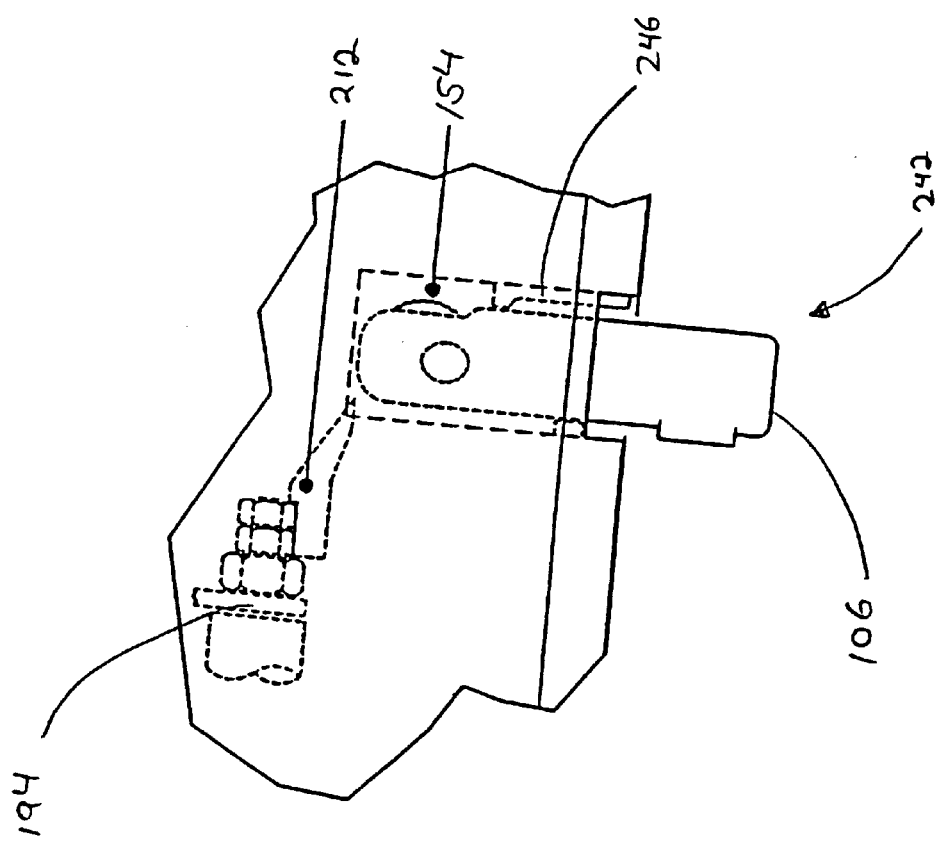
FIG. 14 is a top plan view corresponding to FIG. 9, showing the end opening receptacle and the shearing blade in a first configuration.

As can be seen in FIG. 14, alignment block 246 is disposed within end opening receptacle 132 and serves to align end opening camera 106 when end opening camera 106 is placed within end opening receptacle 132. Alignment block 246 is formed of an inelastic material, such as steel, and is sized so that an end opening camera 106 placed within end opening receptacle 132 will be properly positioned for opening by the film door shearing device 194.

A further benefit to using alignment block 246 is that different size and shape cameras can be accommodated in end opening receptacle 132; a variety of different alignment blocks 246, each corresponding to a particular camera size/shape, can be provided. To change the end opening portion 242 to accommodate a different camera size/shape, the current alignment block 246 need only be replaced with a different alignment block corresponding to the new camera size/shape.

Once end opening switch 134 is depressed in the end opening position by the technician, film door shearing device 194 will actuate and end film compartment 108 will be opened. In the same manner as the bottom opening portion 244, the technician will receive both audible lip and physical indicators (clicks and vibrations) that end film compartment door 108 has been opened. Once end film compartment door 108 has been opened, the technician releases end opening switch 134, and removes end opening camera 106 from end opening receptacle 132 Film canister 104 may now be easily removed from the opened end film compartment door 108 of end opening camera 106.

Figure 15:
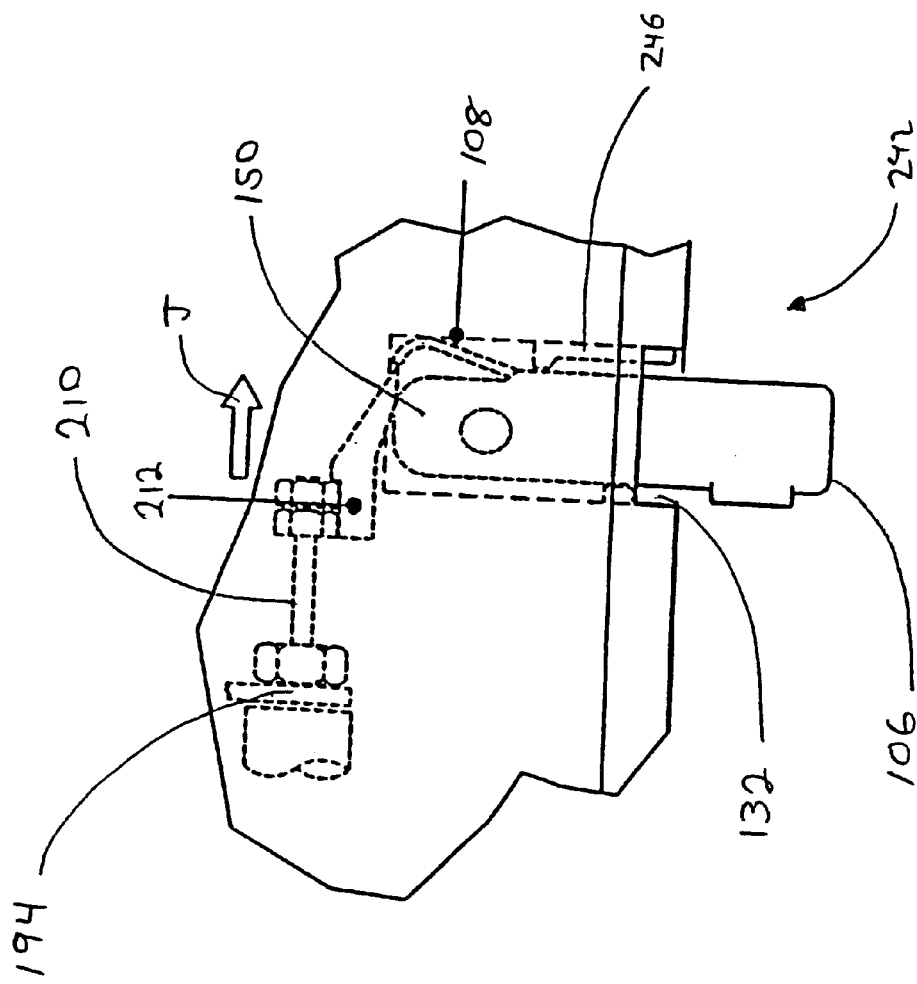
FIG. 15 is a top plan view corresponding to FIG. 9, showing the end opening receptacle and the shearing blade in a second configuration.

With continued reference to FIGS. 14 and 15, the operation of the film door shearing device 194 will be described in further detail. As can be seen in FIG. 14, before end opening switch 134 is placed in the end opening position, film door shearing device 194 is in the unactuated position with shearing blade 212 positioned away from and out of contact with end opening camera 106 (this arrangement facilitates insertion of camera 106 into the end opening receptacle 132). Once end opening switch 134 is depressed into the end opening position, film door shearing device 194 is actuated and hooking arm 210 and shearing blade 212 are actuated and move transversely in the direction of arrow J past the end opening camera 106, as in FIG. 15. Shearing blade 212 is dimensioned such that when film door shearing device 194 is actuated, sharing blade 212 strikes end opening camera 106 and contacts with, and shears open, end film compartment door 108.

End film compartment door 108 can, by way of non-limiting example, be a discrete hinged door which is moved by the shearing blade 212. If desired, a lip could be formed on the door at a position where it will be engaged by the shearing blade 212. Alternatively, the end film compartment door 108 could be an integral part of the camera body, in which case the camera body could have one or more breaklines provided in known fashion to define the door 108. As can also be seen, alignment block 246 serves to facilitate precise positioning of end opening camera 106 during the film door opening process.

Opening the door means creating a space sufficient to permit removal of the film canister. It is not necessary that a portion of the camera body actually be detached.

Turning now to FIG. 11, the pneumatic system 248 of camera opening device 110 will be described in further detail. A compressed air source may be connected to compressed air socket 140. Air regulator valve 160 adjusts the air pressure to a level suitable for proper functioning of the pneumatic valves and actuators within the system. Air pressure may be adjusted by using the air adjustment knob 138 to set the adjustment of air regulator valve 160 to obtain the desired air pressure. Air pressure gauge 136 indicates the system air pressure and allows an operator to determine when air regulator valve 160 is properly set. Compressed air is supplied from air regulator valve 160 through air distribution branch 162 to the winding air supply branch 164, the opening air supply branch 166, and the bottom opening air supply branch 168. Air flow through these supply branches is controlled by winding pneumatic valve 182, end opening pneumatic valve 184 and bottom opening pneumatic valve 186, respectively. These valves are themselves controlled by winding switch 126, end opening switch 134 and bottom opening switch 130 respectively. Within the winding portion air pressure is selectively applied to winding camera holding device 188 and exposure button depressing device 192. Within end opening portion 242, air pressure is selectively applied to film door shearing device 194. Further, within bottom opening portion 244, air pressure is selectively applied to the film door prying device 196 and bottom opening camera holding device 190.

While these devices are controlled pneumatically in an exemplary embodiment, they may also, in the alternative, be controlled electrically or by other means known in the art.

By way of non-limiting example, one or both of the bottom opening portion 244 and the end opening portion 242 could be driven manually. For instance, a hand powered crank or slider could be used attached either directly or by a transmission to power the bottom opening portion 244 or the end opening portion 242.

Figure 12:
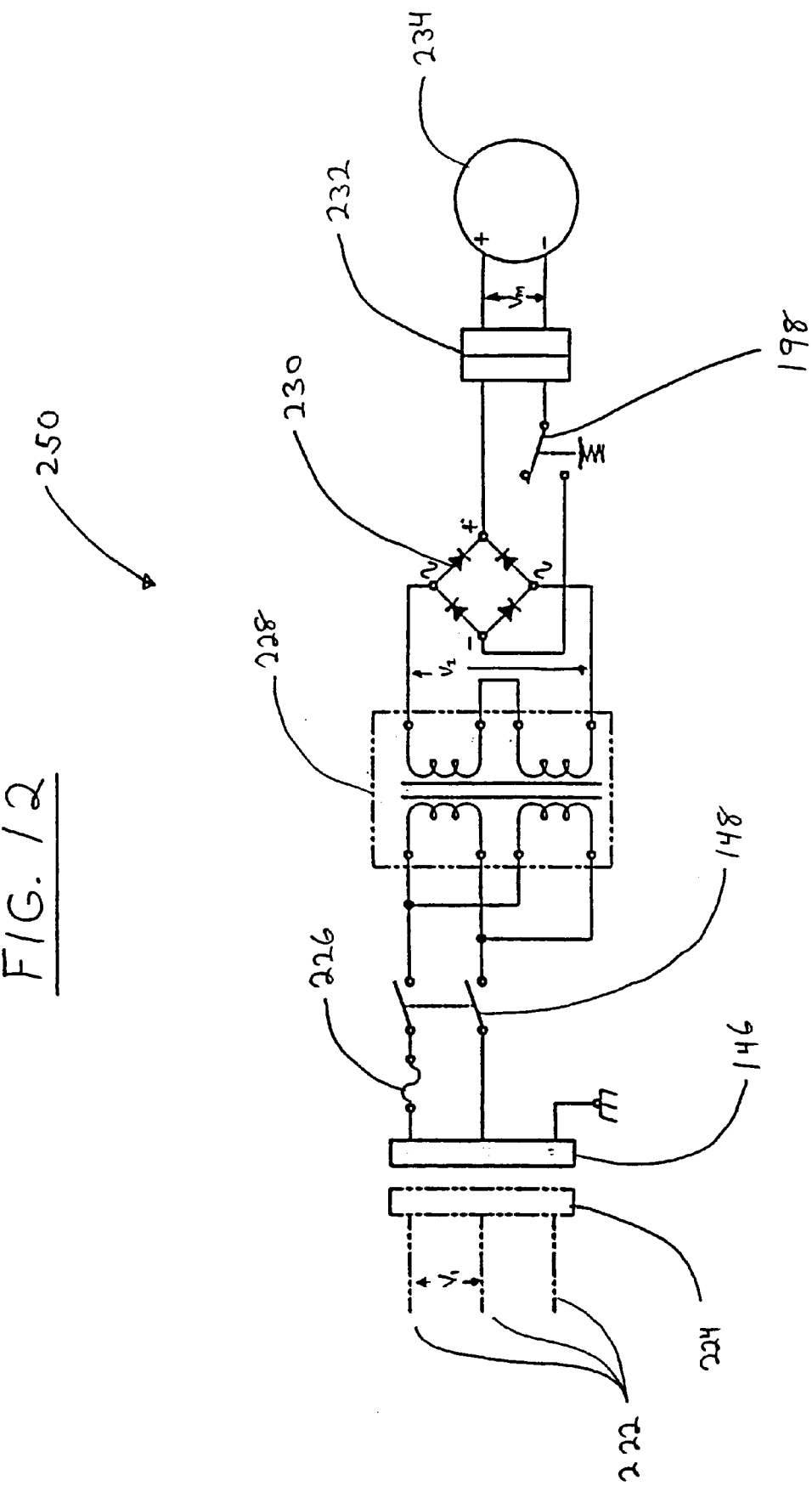
FIG. 12 is a schematic view of an electrical system suitable for use with the present invention.

Turning now to FIG. 12, the electrical system 250 is discussed in general terms. A power cord 222, having a power cord connector 224, may be connected to power cord socket 146. In an exemplary embodiment, power cord 222 is supplied with external 110 volt AC (alternating current) power and has a ground connection. Alternatively, other voltages, such as 220 volt AC or 12 volt DC (direct current) voltage from a generator or a battery may be provided. Voltage $V_1$ is applied to the circuit through fuse 226, and this fuse 226 protects both the technician and the electrical system 250 from harm in the event of a short circuit or other electrical malfunction. Voltage supply to the rest of the circuit is controlled by power switch 148. The supplied electrical power has its voltage altered by transformer 228, which serves both to step down voltage $V_1$ to voltage $V_2$ and also to isolate the rest of the circuit from ambient electrical noise that may be in the external power supply. The stepped down voltage $V_2$ is then rectified by diode bridge rectifier 230 and is thus converted to a step down DC voltage $V_m$. Step down rectified DC voltage $V_m$ is then applied to DC motor 234 through connector 232. DC motor 234 drives motorized wheel 236 which has been described in connection with the winding process. Exposure button interlock 198 is disposed in series between the diode bridge rectifier 230 and the DC motor 234 to control the power supply to DC motor 234. Exposure button interlock 198 serves to disconnect DC motor 234 from the DC power supply in cases where the exposure button depressing device 192 is not properly depressed as has also been described in connection with the winding process.

Other systems also could be used to control device operation. A more sophisticated arrangement might employ a computer linked to various sensors and actuators. Alternatively, mechanical interlocks and stops could be used.

Figure 16:
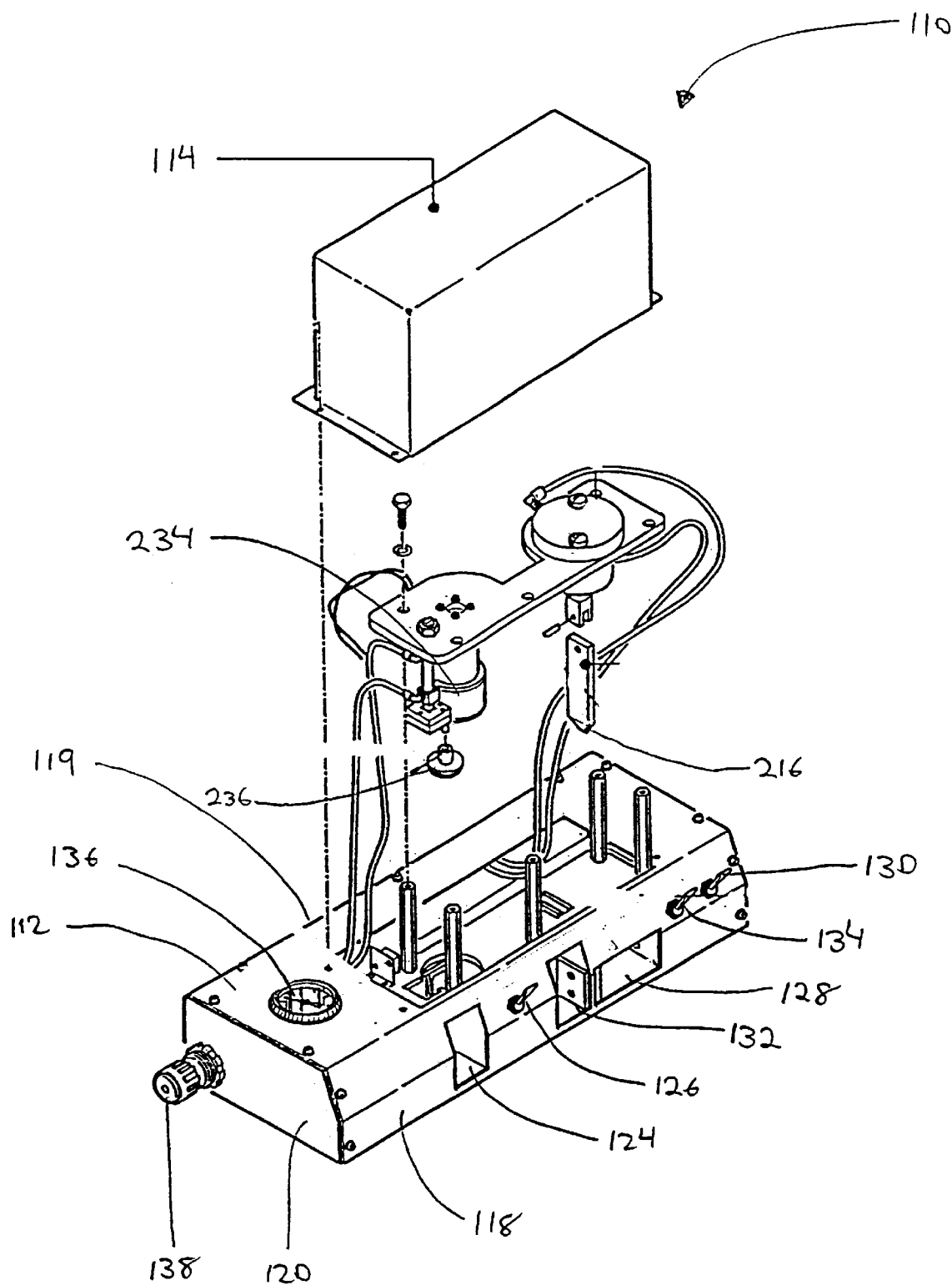
FIG. 16 is an exploded top perspective view of the camera opening device of FIG. 3.

Turning now to FIG. 16, an exploded perspective view of camera opening device 110 with access cover 114 removed is shown. Access cover 114 can be removed to facilitate maintenance, troubleshooting and repair of camera opening device 110. Further, the camera opening device 110 can be operated with access cover 114 removed so that all of the inner workings of camera opening device 110 can be observed when performing their functions on a camera. In this way, any problems during operation of the camera opening device 110 may be readily resolved.

Alternatively, while in an exemplary embodiment, the motorized wheel is powered by electric motor 234, it could also be powered by other means such as air pressure and an air motor, a manual-driven crank or slider, as described above, or any other suitable means.

As can be discerned from the above descriptions, the camera opening device constructed in accordance with the present invention will facilitate the quick and easy opening of single use cameras and removal of film canisters from within. By using the camera opening device 110 of the present invention, the film canisters can be removed more quickly and without the physical dangers that accompany prying open the film door by using a sharp blade, screwdriver, knife or other manual opening tool. This way, both safety and productivity can be improved.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A camera opening device, for use with a single-use camera having an exposure button and a canister containing a film therein, comprising:

a base;

at least one of
an end opening portion disposed in said base and which can open an end portion of the camera; and
a bottom opening portion disposed in said base and which can open a bottom portion of the camera; and a winding portion disposed in said base and which winds the film into the canister, said winding portion comprising,
a winding receptacle dimensioned and disposed to receive the camera;
an exposure button pressing device dimensioned and disposed to press the exposure button of the camera when the camera is received in the winding receptacle;
an exposure button interlock switch which detects when the exposure button is pressed;
a winding switch;
a wheel for winding film in the camera when the winding switch is actuated; and
a camera winding holding device which secures the camera as the film is wound by the wheel.

2. A camera opening device according to claim 1, wherein the end portion of the camera is removed.

3. A camera opening device according to claim 1, wherein the bottom portion of the camera is removed.

4. The camera opening device of claim 1, wherein the wheel is a motorized wheel.

5. The camera opening device of claim 1, wherein said exposure button pressing device comprises an exposure button depressing arm, said depressing arm having a depressing foot for depressing the camera's exposure button, and
said camera winding holding device comprises a camera winding holding arm, said camera winding holding arm having a holding end that holds the camera in place as the film is wound by the wheel.

6. A camera opening device, for use with a single-use camera having an exposure button and a canister containing a film therein, comprising:

a base; and an end opening portion disposed in said base and which can open an end portion of the camera; and a bottom opening portion disposed in said base and which can open a bottom portion of the camera, said end opening portion comprising:
an end opening receptacle dimensioned and disposed to receive the camera;

a film door shearing device; and an end opening switch which actuates the film door shearing device.

7. The camera opening device of claim 6, wherein said film door shearing device has a shearing blade disposed on a shearing arm that shears and opens a film compartment door of the camera, the camera being an end opening-type camera.

8. A camera opening device, for use with a single-use camera having an exposure button and a canister containing a film therein comprising:

a base; and an end opening portion disposed in said base and which can open an end portion of the camera; and a bottom opening portion disposed in said base and which can open a bottom portion of the camera, said bottom opening portion comprising, a bottom opening receptacle dimensioned and disposed to receive the camera;

a bottom opening camera retention device;

a film door prying device; and a bottom opening switch which actuates the bottom opening camera retention device and the film door prying device.

9. The camera opening device of claim 8, wherein said film door prying device has a prying blade disposed on a prying arm that prics and opens a film compartment door of the camera, the camera being a bottom opening-type camera, and said bottom opening camera device has a bottom opening holding arm having a holding end for holding said camera in place during a camera opening operation.

10. A method for opening a camera having an exposure button and a film canister therein and extracting the film canister therefrom, comprising the steps of:

depressing the exposure button;

sensing whether the exposure button is depressed;

winding the film by turning a winding wheel only upon sensing that the exposure button is depressed;

stopping winding the film at an appropriate time;

engaging a film door opening device to open a film door;

disengaging the film door opening device; and removing the film canister from the camera.

11. A method for opening a camera according to claim 10, further comprising the step of releasing the exposure button.

12. A method for opening a camera according to claim 10, further comprising the step of inserting the camera into an opening receptacle.

13. A method for opening a camera according to claim 10, further comprising the step of removing the camera from an opening receptacle.

14. A method for opening a camera having an exposure button, a winding wheel and a film canister therein and extracting the film canister therefrom, comprising the steps of:

engaging a camera holding device to hold the camera in place;

engaging an exposure button depressing device to depress the exposure button;

depressing a winding switch to wind the film;

sensing, with an exposure button interlock switch, whether the exposure button depressing device is engaged;

turning the winding wheel upon sensing that the exposure button depressing device is engaged;

stopping turning the winding wheel at an appropriate time;

inserting the camera into an opening receptacle; and actuating a film door opening device to open a film door.

15. A method for opening a camera according to claim 14, further comprising the step of actuating a winding motor to turn the winding wheel upon sensing that the exposure button depressing device is engaged.

16. A method for opening a camera according to claim 14, further comprising the step of engaging an opening switch to cause the actuating of the film door opening device.

17. A method for opening a camera according to claim 14, further comprising the step of removing the film canister from the camera.

18. A method according to claim 14, wherein the camera is a single-use camera.

19. A method according to claim 14, wherein the camera has a bottom and the film door is located in the bottom of the camera.

20. A method according to claim 14, wherein the camera has an end and the film door is located it, the end of the camera.

* * * * *